United States Patent

[11] 3,584,779

[72] Inventors: Clarence W. Kessler, Dayton;
Ollah Combs, Morrow; Larry D. Miller, Miamisburg, all of, Ohio; Frank S. C. Mo, Bedford, Mass.
[21] Appl. No. 765,528
[22] Filed Oct. 7, 1968
[45] Patented June 15, 1971
[73] Assignee The National Cash Register Company Dayton, Ohio

[54] OPTICAL DATA SENSING SYSTEM
4 Claims, 10 Drawing Figs.

[52] U.S. Cl. .................................... 235/61.11, 250/227
[51] Int. Cl. .................................................. G06k 7/10
[50] Field of Search ........................... 235/61.115; 340/146.3; 250/227; 350/96

[56] References Cited
UNITED STATES PATENTS

| | | | |
|---|---|---|---|
| 2,420,716 | 5/1947 | Morton et al. | 235/61.115 UD |
| 2,899,132 | 8/1959 | Orthuber | 235/61.115 |
| 3,145,291 | 8/1964 | Brainerd | 235/61.115 |
| 3,229,075 | 1/1966 | Palti | 235/61.115 |
| 3,238,501 | 3/1966 | Mak et al. | 340/146.3 |
| 3,277,283 | 10/1966 | Rabinow et al. | 340/146.3 |
| 3,327,584 | 6/1967 | Kissinger | 250/227 |
| 3,417,234 | 12/1968 | Sundblad | 235/61.115 |

*Primary Examiner*—Maynard R. Wilbur
*Assistant Examiner*—William W. Cochran
*Attorneys*—Louis A. Kline, Albert L. Sessler, Jr. and Elmer Wargo ABSTRACT: A semiautomated sensing system which employs a hand-held, optical-probe scanner for detecting coded information from a color-coded record member which may, if desired, be secured to an article. Data is color-coded (by bands of different colors) on the record member, and, when the data is to be read, the probe scanner is "scribed" or glided across the bands of color on the record member. During the "scribing," or reading, operation, the changing light signals resulting therefrom are routed to electronic circuitry which converts the light signals to electrical signals which are routed to a processor for use thereby. The output from the processor may be used to drive a sales register, an accounting machine, or other display and electronic computation and printout equipment.

INVENTORS—CLARENCE W. KESSLER, FRANK S. C. MO,
OLLAH COMBS & LARRY D. MILLER

THEIR ATTORNEYS

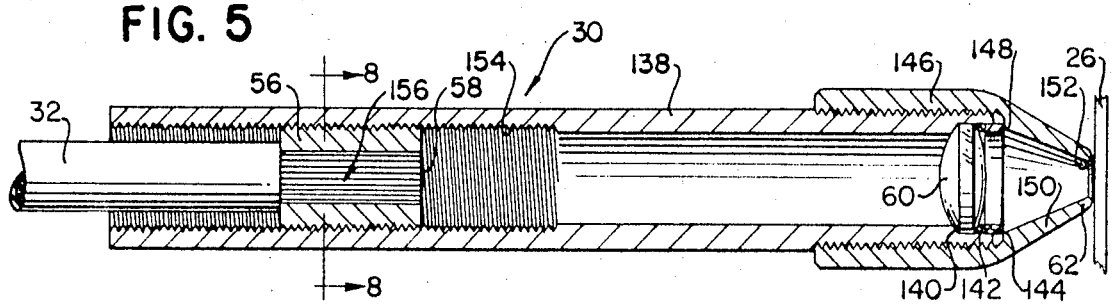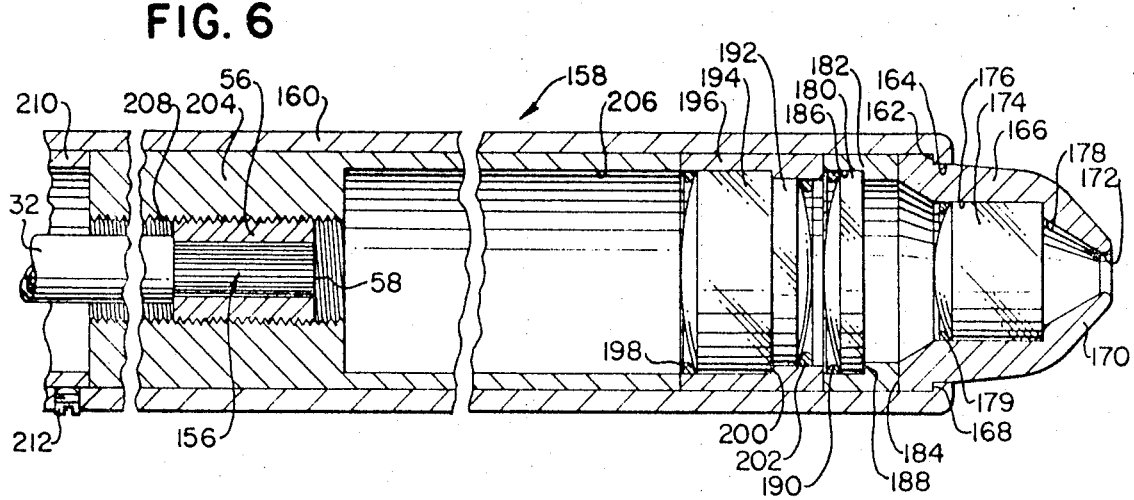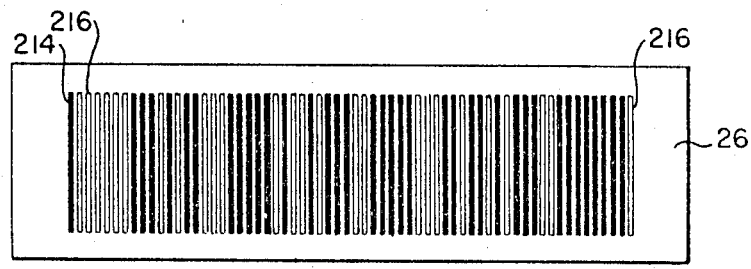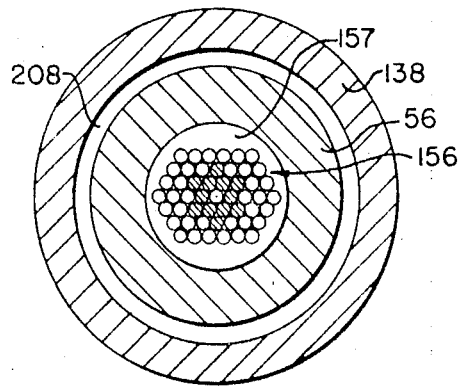

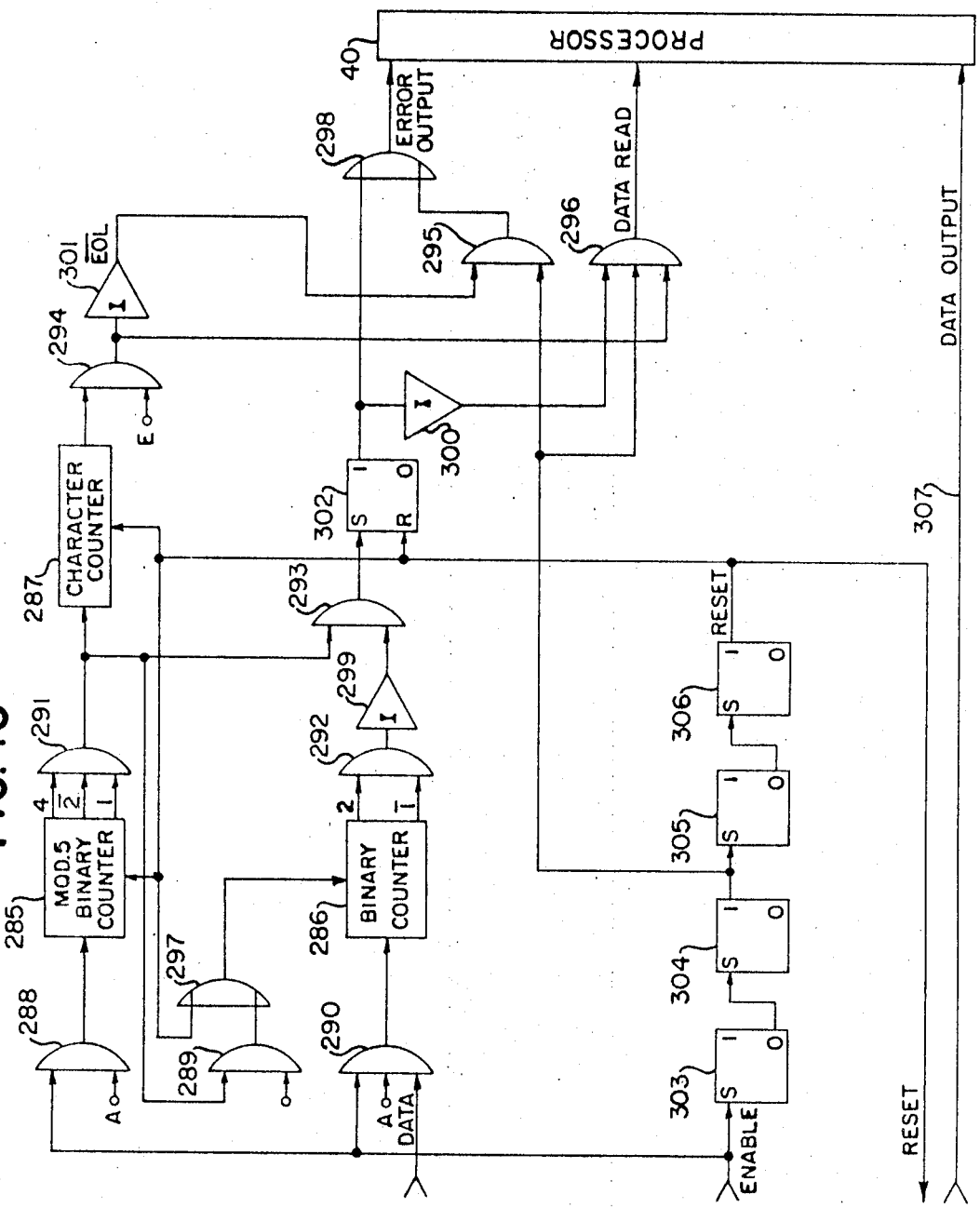

1

OPTICAL DATA SENSING SYSTEM

BACKGROUND OF THE INVENTION

This invention relates to a semiautomated sensing system which employs a hand-held optical probe scanner for detecting coded data from a color-coded recorder member which may, if desired, be secured to an article, the record member bearing data corresponding to the article to which it is secured, or bearing other information, such as that which would appear on a credit card, for example.

Automated sensing systems, such as those which may be used for checkout systems, are not new. However, these systems require complex, expensive, electronic equipment to provide for the reading of labels secured to articles which may be oriented in a random manner when passing a checkout station. One such system is shown in U.S. Pat. No. 3,246,126, which issued Apr. 12, 1966, on the application of Ernest W. Schlieben et al.

Color-coded labels used in identification systems which are also complex are shown in U.S. Pat. No. 3,145,291, which issued to Henry Bowen Brainerd on Aug. 18, 1964, and in U.S. Pat. No. 3,225,177, which issued Dec. 21, 1965, on the application of Francis H. Stites and Raymond Alexander. An optical scanning pen is shown in U.S. Pat. No. 3,238,501, which issued Mar. 1, 1966, on the application of Stephen M. F. Mak et al. and is assigned to the assignee of the present invention.

The present invention obviates many of the difficulties encountered in the prior art, automated, data-sensing systems. The hand-held, optical-probe scanner, for example, when used in a checkout system, enables an operator to perform the label-orienting function without an appreciable loss in checkout time when compared to a checkout system employing an automatic scanner. An additional advantage of using a probe scanner is that the marking format employed on the label is greatly simplified and can be made more flexible than is possible with an automatic scanner. With the probe scanner, the related electronic circuitry used in the system is simplified, thereby lowering the cost of the checkout system. The probe-type scanner can be maneuvered to where the labels are, whereas, in checkout systems employing an automatic scanner, the items bearing the labels to be read must be maneuvered towards the scanner. Consequently, oddly shaped or clumsy items can be checked more easily with a probe-type scanner than with a fixed automatic scanner. In addition, the probe-scanner is also versatile in that it may also be fixed and the label moved past the stationary probe to effect a reading relationship if such a situation proves desirable. For automatic scanners, the label to be read must generally be secured to a flat and exposed surface on the item with which the label is associated. By contrast, the probe-type scanner can readily read labels secured to nonflat surfaces. The label used with the probe-type scanner is not restricted to a fixed tag size with a specific number of bits, as is generally the case with automatic scanners. The label used with the probe-type scanner is economical and can be printed by ordinary printing methods.

SUMMARY OF THE INVENTION

This invention relates to an apparatus for detecting data from a record member which may, if desired, be affixed to an article, and which may bear coded data relating to the article. The invention is shown therein as embodied in a semiautomated checkout system, but it is to be understood that the invention is not limited to this particular use and could be used in other systems in which sensing of information from a record member is required. In the illustrated embodiment, the apparatus includes a probe means, which is generally penlike in shape and is adaptable to be held in the hand of an operator. The probe means has a reading end which is traversed or scribed in a scanning movement across the label when the probe means is in reading relationship therewith.

The probe means includes a first means for directing light rays out of said reading end, and a second means for receiving reflected light from the label when the reading end is in reading relationship with the label. Data relating to an item is color-coded on the label which is attached to the item.

Circuit means are used for converting the reflected light obtained during the reading operation into electrical signals corresponding to the coded data appearing in the label being read. The output of the circuit means may be used to drive a sales register, an accounting machine, or other display, as well as electronic computation and printout equipment.

The apparatus provides a reliable, relatively simple, inexpensive way of obtaining data with respect to items in a checkout system, an inventory control system, or the like.

BRIEF DESCRIPTION OF THE DRAWINGS

FIG. 5 is an enlarged, side elevational view, partly in cross section, of the probe shown in FIGS. 1 and 2.

FIG. 6 is an enlarged, side elevational view, partly in cross section, of a second embodiment of the probe of this invention.

FIG. 7 is a plan view of a color-coded label used with this invention.

FIG. 8 is an enlarged cross-sectional view of the cable used with the probe and is taken along the line 8—8 of FIG. 5.

FIGS. 9 and 10 taken together show, in block form, a schematic diagram of the circuit means used with this invention.

DESCRIPTION OF THE PREFERRED EMBODIMENT

Figure 1:
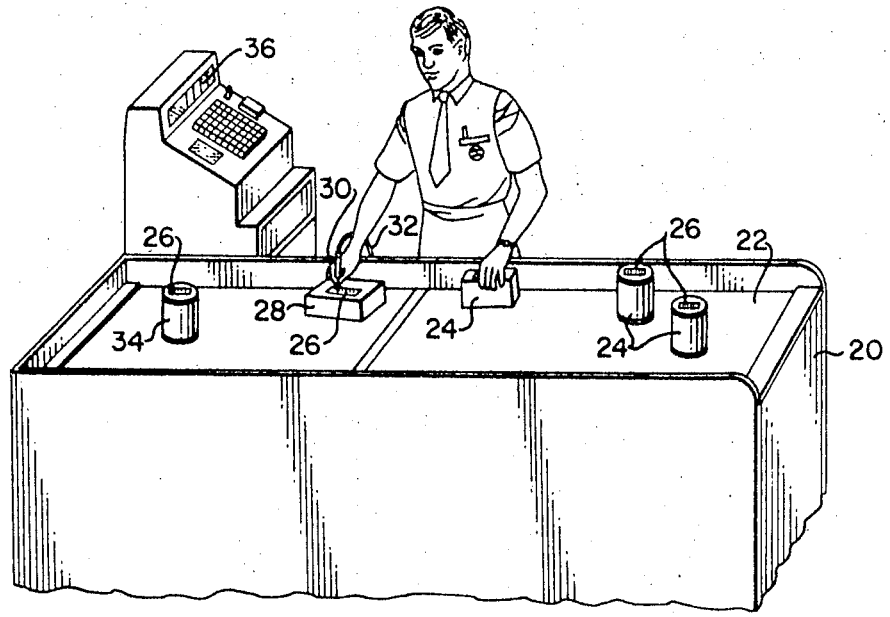
FIG. 1 is a general view, in perspective, of the apparatus of this invention being used at a checkout counter. The apparatus shown includes a hand-held probe being scribed across a color-coded label bearing data relating to the item to which the label is affixed.

FIG. 1 is a general view, in perspective, of the apparatus of this invention being used at a checkout counter, which represents a typical application for this invention, it being understood that this invention may also be used for other applications, as mentioned above.

The checkout counter in FIG. 1 includes a counter 20 having thereon a moving conveyor belt 22, which transports a plurality of items 24 towards the operator shown. Each of the items 24 has its own label 26, and specific data relating to each time appears in coded form on the label. The specific code used on the labels 26 will be discussed hereinafter.

The operator in FIG. 1 is shown in the process of reading the data on a label 26 which is secured to an item marked 28. To read the data on a label 26, the operator holds a probe 30 in his hand, as one would hold a pen, and scribes or glides a reading end of the probe from one end of the label, across the length of the label, to its opposite end. A cable 32 is secured to one end of the probe 30, which is opposite to its reading end. The data from a label 26 which is attached to an item 34 has already been read. As the label 26 are read, at least part of the data therein (like the price of the item) is visually recorded at the display window 36 of a cash register 38 or a conventional display device which may be used in handling payment for the items, and which cash register may be driven by the information obtained from the label 26.

Figure 2:
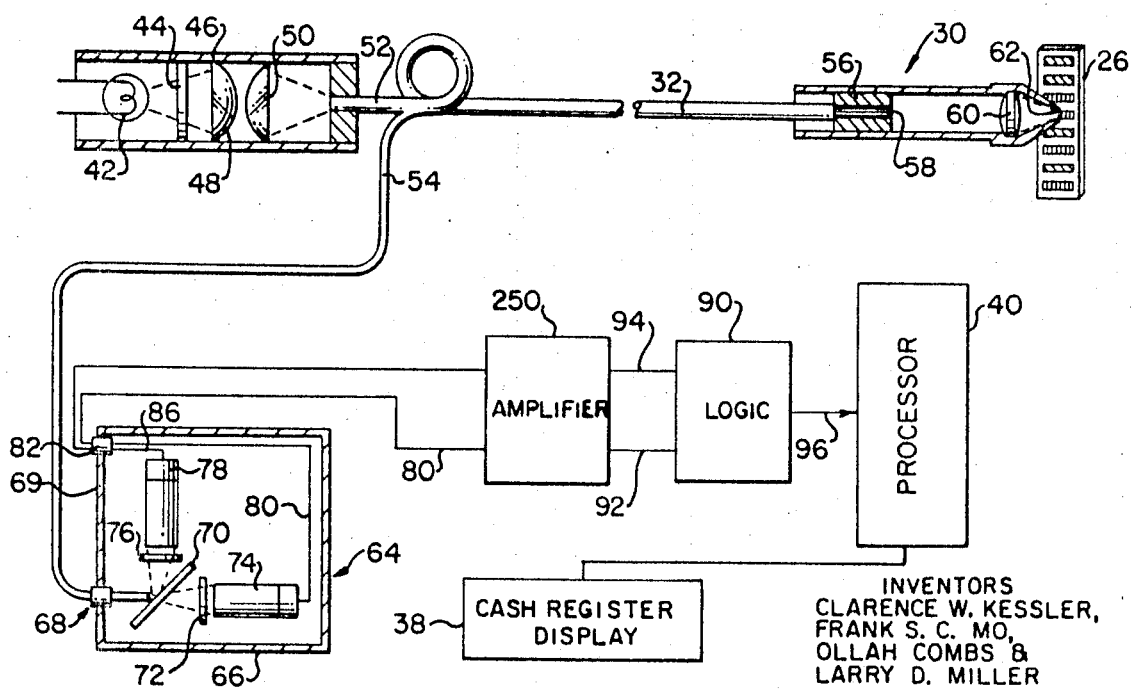
FIG. 2 is a general schematic view showing the general relationship of the probe, the color-coded label, and means for converting the coded data into electrical signals which may be used by a processor like a computer.

FIG. 2 shows the general arrangement of the label 26, probe means including the probe 30, and transducer means for converting the coded data on the label into electrical signals which are used by the processor 40, which may be a calculator. The probe means includes a light source 42, whose rays pass through an infrared filter 44, which is mounted in a housing 46. From the filter 44, the light rays pass through conventional condensing lenses 48 and 50 (also mounted in the housing 46), so as to direct the rays onto the ends of a first bundle 52 of light pipes or optic fibers. This first bundle 52 of optic fibers is housed in the common cable 32, having a lightproof, abrasion-resistant cover, which also houses a second bundle 54 of light pipes or optic fibers. The first bundle 52 of optic fibers has a conventional, lightproof, abrasion-resistant cover protecting the fibers for that length not housed in the cable 32, and the same is true of the second bundle 54 of optic fibers.

The first and second bundles 52 and 54 (FIG. 2), respectively, of optic fibers included in the cable 32 operate as follows. The cable 32 is secured in one end of the probe 30 by a member 56 (FIG. 5), which may be adjustably positioned along the length of the probe. The ends of the optic fibers of both the first and second bundles 52 and 54, respectively, terminate in a plane 58, which is perpendicular to the optical axis of the probe 30. Light passing through the first bundle 52 of optic fibers passes through an imaging lens 60 and is directed out of the reading end 62 of the probe 30 onto the label 26. As the reading end 62 of the probe 30 contacts and is scribed across the label 26 in reading relationship therewith, light reflected therefrom passes through the lens 60 and is brought to focus on the second bundle 54 of optic fibers at the plane 58. Details relating to the color codes used on the label 26 will be described in detail hereinafter in relation to FIG. 7. For the present, it is sufficient to state that the color codes appear in the form of red stripes and green stripes in various combinations on a white background on the label 26. The changing light patterns, reflected back into the reading end 62 of the probe 30 as the label is read, are routed by the second bundle 54 of optic fibers to the transducer means, designated generally as 64 (FIG. 2).

The transducer means 64 (FIG. 2) includes an opaque, lightproof housing 66 having a coupling member 68 in one wall 69 thereof. The coupling member 68 is used to secure the second bundle 54 of optic fibers to the housing 66. The end of the second bundle 54 of optic fibers is directed at a beam splitter 70, which is positioned at an angle of 45° relative to the longitudinal axis of the bundle 54. Part of the light of the second bundle 54 of optic fibers is transmitted through the beam splitter 70 and a filter 72 to impinge upon a light-responsive member 74, and the remaining part of the light is reflected from the beam splitter 70 and passes through a filter 76 to impinge upon a light-responsive member 78.

The filters 72 and 76 and the light-responsive members 74 and 78 (FIG. 2) are so selected as to be compatible with the particular colors used on the label 26. For example, when green and red colors are chosen for the label 26, the filter 72 is spectrally matched to the light reflected from the green stripes or bars on the label 26, so that the filter 72 permits green signals to readily pass therethrough, but red signals are almost totally absorbed or reflected by the filter 72. Conversely, the filter 76 is spectrally matched to the light reflected from the red strips on the label 26, so that the filter 76 permits red signals to readily pass therethrough, but green signals are almost totally absorbed or reflected by the filter 76. Both filters 72 and 76 permit white light reflected from the background of the label 26 to pass therethrough. The white background appears in the form of a stripe between the red or green stripes used in the code, and the white stripes on the label 26 are used for clocking purposes. This aspect will be later described when details of the circuitry (FIGS. 9 and 10) used with this invention are discussed.

Figure 9:
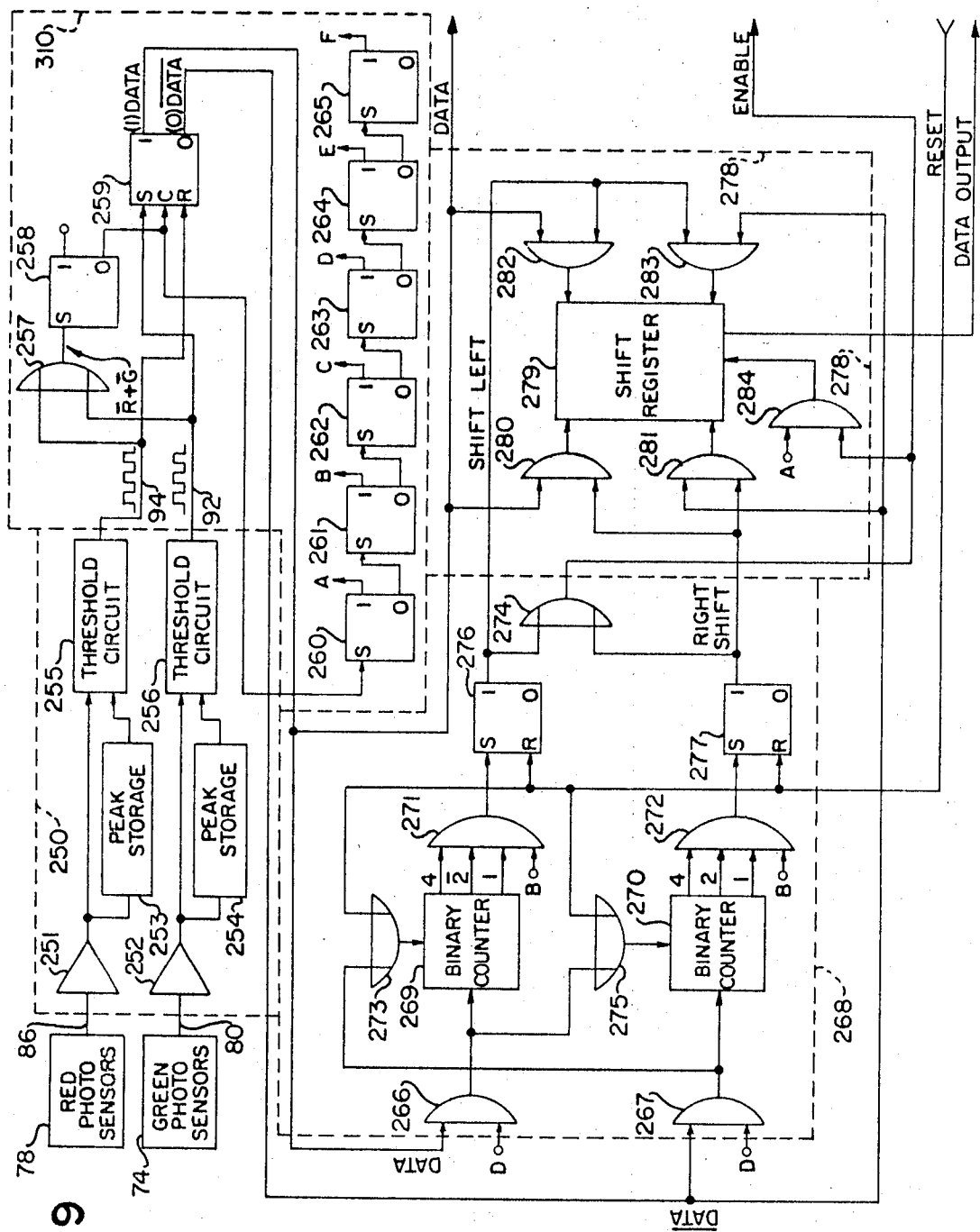

The output from the light-responsive member 74 (FIG. 2) is routed over a conductor 80 through a coupling member 82 in the wall 69 to a signal processor network, which is generally designated as 250 and which is shown in detail in FIG. 9. Similarly, the output from the light-responsive member 78 is routed over a conductor 86, through the coupling member 82, to the signal processor network 250. The outputs of the network 250 are rounded to logic circuits 90 (FIG. 2) (shown in block form) by conductors 92 and 94, respectively, where these outputs are converted into binary pulses which correspond to the data on the label being read. The output from the logic circuits 90 is routed over a conductor 96 to the processor 40, where the data is used for calculation, used for conversion to decimal form (for displaying the window 36), or otherwise used for preparing various reports (such as inventory or cost analysis reports). As previously stated, the output of the processor 40 may be used to conventionally drive the cash register through a system of a decoding matrix which is used to actuate a system of solenoid drivers which may be employed to operate key mechanism of the cash register 38.

Figure 3:
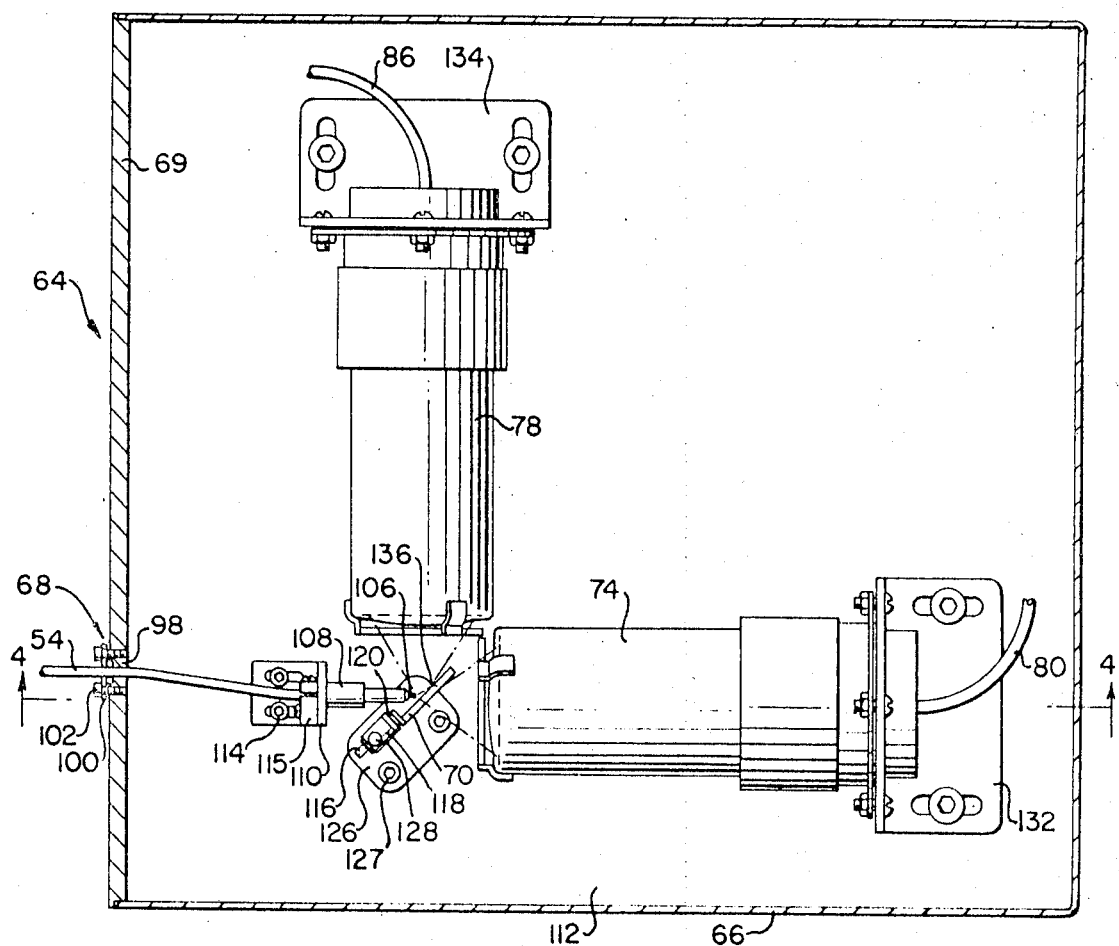
FIG. 3 is a plan view of an actual embodiment of the transducer means shown only schematically in FIG. 2.
Figure 4:
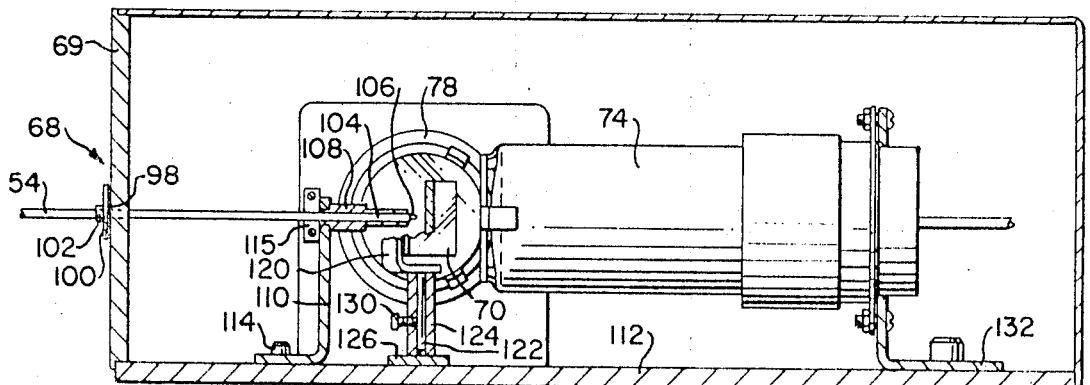
FIG. 4 is a side, elevational view, partly in cross section, showing additional details of the transducer means, and is taken along the line 4—4 of FIG. 3.

The details of the transducer means 64 (shown only schematically in FIG. 2) are shown in FIGS. 3 and 4. The second bundle 54 of optic fibers passes through the lightproof coupling member 68 in the housing 66, which coupling member includes a resilient O-ring 98 and an apertured plate 100. After the second bundle 54 of optic fibers is inserted through the aperture of the plate 100, the O-ring 98, and a hole in the wall 69, fasteners 102 are tightened to draw the plate 100 against the wall 69 and thereby compress the ring 98 to form the lightproof connection. The coupling member 82 (shown only in FIG. 2) is similar in construction to the coupling member 68, just described.

The second bundle 54 of optic fibers is supported in the housing 66 by the following-described construction, shown in FIGS. 3 and 4. The second bundle 54 of fibers has the lightproof, abrasion-resistant cover 104 (better shown in FIG. 4) surrounding the bundle of individual optic fibers 106. A sleeve member 108 surrounds the bundle 54 and permits the fibers 106 to extend from one end of the cover 104 and its sleeve member 108, as shown. The other end of the sleeve member 108 is threadedly secured to a bracket 110, which is adjustably secured to the base 112 of the housing 66 by fasteners 114. The bracket 110 and the sleeve member 108 enable the longitudinal axis of the second bundle 54 of optic fibers to be positioned parallel to the base 112. The second bundle 54 of optic fibers is axially movable within the sleeve 108 and can be fixed relative to the bracket 110 by a conventional clamp 115 secured to the bracket 110.

The second bundle 54 of optic fibers, the beam splitter 70, and the light-responsive members 74 and 78 are arranged as follows. As shown in FIGS. 3 and 4, the longitudinal axis of the second bundle 54 of optic fibers is directed at the beam splitter 70. The beam splitter 70 has one side thereof secured to a shaft 116 (FIG. 3), which is rotatably mounted in a bushing 118, which is fixed to one leg of an L-shaped bracket 120. The other leg of the bracket 120 is fixed to a shaft 122, which is rotatably mounted in a sleeve member 124 having a base 126 secured to the base 112 of the housing 66 by a fastener 127. By this construction, the beam splitter 70 may be rotated about the longitudinal axis of the shaft 116, which is parallel to the base 112 and fixed relative to the bracket 120 by a fastener 128 (FIG. 3), and the beam splitter 70 also may be rotated about the longitudinal axis of the shaft 122, which is perpendicular to the base 112. A fastener 130 is used to fix the shaft 122 relative to the base 112. The light-responsive members 74 and 78 each have conventional, adjustable brackets 132 and 134, respectively, to provide adjustability in mounting them on the base 112. The light-responsive member 74 is so positioned that its longitudinal axis is coincident with the longitudinal axis of the second bundle 54 of optic fibers, and the longitudinal axis of the light-responsive member 78 is so positioned that it is perpendicular to a line joining the axes of said bundle 54 and said member 74. The longitudinal axes of the members 74 and 78 and the second bundle 54 of optic fibers lie in a common plane, which is parallel to the base 112 and which said axis intersect (when extended) in a common intersection point 136. The beam splitter 70 is positioned at the common intersection point 136 so as to direct rays of light into the light-responsive members 74 and 78, as previously explained.

The specific optic fibers, light-responsive members, and other elements used in the transducer means 64 shown in FIGS. 3 and 4 are as follows. The optic fibers used in the cable 32 are plastic light pipes having a 0.010-inch diameter and are made of any suitable material, such as that sold under the trademark "Crofon" by E. I. duPont deNemours and Company, Wilmington, Del., U.S.A. In the embodiment shown, there are 52 such fibers in the first bundle 52, and 12 such fibers in the second bundle 54. The particular arrangement of the individual fibers of the first and second bundles 52 and 54, respectively, at the plane 58 (FIG. 2) will be later described in relation to FIG. 8. The filter 72 is a green filter 090-1-560 manufactured by Bausch & Lomb Incorporated, Rochester, N.Y., U.S.A. The filter 76 is a red filter OCS 2-61 manufactured by Corning Glass Works, Corning, N.Y., U.S.A. The light-responsive members 74 and 78 are identical and are photo multiplier tubes 06217 having an S 10 response curve and are manufactured by Radio Corporation of America New York, N.Y., U.S.A.

The specific elements shown in the housing 46 (FIG. 2) are as follows. The light source 42 is a conventional 8-volt, 50-watt tungsten light bulb manufactured by OSRAM, of Germany, and bears the number 58.8007. The filter 44, while shown as only one infrared filter in FIG. 2, may be composed of two filters. A reflective coated infrared filter (Bausch & Lomb 090-7) may be placed next to the light source 42, and an absorption infrared filter (Corning CS 1-69) may be placed between said reflective filter and the lens 48. The imaging lenses 48 and 50 are part of a standard Bausch & Lomb lens (.70 N. A.) having a focal length of 20 millimeters.

FIG. 5 shows an enlarged cross-sectional view of the probe 30 shown in FIGS. 1 and 2. In one embodiment, the probe 30 itself is about 1¾ inches long and has a diameter of about 0.312 inch. The probe 30 has a housing 138, which is tubular, which is circular in cross section, and which is made of a lightproof material like metal or opaque plastic. One end of the housing 138 has therein a shoulder 140, against which the lens 60 abuts. The lens 60 is a conventional objective lens having a focal length of 4.82 millimeters and a diameter of 5 millimeters. A resilient O-ring 142 is positioned against the lens 60 on the side thereof which is opposite to the shoulder 140, and a retaining ring 144 is positioned against the O-ring 142. The right-hand end of the housing 138 (as viewed in FIG. 5) is externally threaded to receive a threaded cap 146, which has an internal annular face 148 therein. When the cap 146 is threaded on the housing 138, the face 148 forces the ring 144, the O-ring 142, and the lens 60 to the left (as viewed in FIG. 5) to seat the lens 60 against the shoulder 140. The O-ring 142 is resilient enough to allow for minor adjustments in the distance between the lens 60 and the reading end 150 of the cap 146 when the probe 30 is in reading relationship with a label 26. This enables the lens 60 to be accurately focused with respect to the label 26 so as to obtain the best signal strength. As an alternate construction, the lens 60 may be conventionally cemented to the shoulder 140. A small setscrew (not shown) may be used to prevent the rotation of the cap 146 relative to the housing 138 once it is in the desired position.

The reading end 150 of the probe 30 has therein an opening 152, through which the light from the cable 32 passes to reach the label 26 (FIG. 5), and the light reflected from the label comes back through the opening 152, through the lens 60, and to the second bundle 54 of optic fibers in the cable 32, as previously explained. The reading end 150 of the cap 146 is shaped like the frustum of a cone, with its angle of taper conforming to the path which the rays of light follow in passing from the lens 60 to the label 26 and in being reflected therefrom back through the lens 60 to the plane 58 of the bundles of optic fibers. The longitudinal axis of the cable 32 is coincident with the longitudinal axis of the housing 138, the optical axis of the lens 60, and the longitudinal axis of the opening 152, which is circular in cross section. In the embodiment shown, the diameter of the opening 152 is 0.0625 inch.

The cap 146 is made of a conventional hardened steel, so as to withstand the wear caused by the reading end being scribed across a label 26. The area of the cap 146 surrounding the opening 152 is polished, so as to enable the reading end 150 to glide across a label 26 during the reading process.

The housing 138 (FIG. 5) has internal threads 154 to receive the externally threaded member 56, which is made of opaque material, so as to eliminate stray light in the probe 30. The cable 32 has a conventional cover to protect the individual optic fibers of the first and second bundles from stray light and abrasion, as previously mentioned. This cover on the cable 32 is stripped away from one end thereof to expose the individual optic fibers, designated generally as 156. These fibers are then secured to the internal diameter of the member 56 by an adhesivelike epoxy 157 (FIG. 8) or other suitable means. The member 56 is actually a sleeve having external threads (mating with the threads 154 of the housing 138) which enable the member 56 to be adjustably positioned in an axial direction relative to the lens 60. After the fibers 156 are secured to the member 56, the ends of the fibers are cut and polished, so that they all lie in the plane 58, which is perpendicular to the optical axis of the lens 60. After the member 56 is rotated in the housing 138, so as to bring the plane 58 into the desired distance relationship with the lens 60 (which in the embodiment shown is approximately 0.938 inch), the member 56 can be fixed relative to the housing 138 by a set screw (not shown).

A second embodiment of the probe used in the invention and designated generally as 158 is shown in FIG. 6. The probe 158 includes a tubular housing 160, which is circular in cross section and which is open at the left-hand end (as viewed in FIG. 6). The right-hand end of the housing 160 has an annular shoulder 162 formed thereon adjacent to an aperture 164, which is formed therein. A tubular cap 166, having an annular shoulder 168 thereon, is positioned at the right-hand end, as shown in FIG. 6, so that the shoulder 168 abuts against the shoulder 162 on the housing 160 to form a light-sealed connection therebetween. The cap 166 has a reading end 170, which extends through the aperture 164, and the reading end 170 has an aperture 172 therein. The cap 166 is made of hardened steel, and the reading end 170 is polished, so that it glides over a label 26 when in reading relationship therewith.

The optical imaging system for the probe 158 shown in FIG. 6 is constructed in the following manner. A first lens 174 is positioned in a bore 176 located in the cap 166 and abuts against an annular shoulder 178 formed in the rightmost end (as viewed in FIG. 6) of said cap. The lens 174 is retained in the bore 176, against the shoulder 178, by a conventional C-type retaining ring 179. A second lens 180 is mounted in a sleeve 182, which fits in the housing 160 and whose rightmost annular face (as viewed in FIG. 6) abuts against the annular face 184 of the cap 166. The sleeve 182 has an enlarged bore 186 therein and an annular shoulder 188 formed at the rightmost end of the sleeve. After the lens 180 is positioned in the bore 186, a conventional C-type retaining ring 190 is used to retain the lens against the shoulder 188. A third lens 192 and a fourth lens 194 are mounted in a sleeve 196, which fits inside the housing 160, and the sleeve 196 abuts against the sleeve 182 when positioned thereat. The lens 194 is mounted in the sleeve 196 in the same manner as the lens 180 was mounted in the sleeve 182, and, similarly, a C-type retaining ring 198 is used to retain the lens 194 in abutting engagement with an annular shoulder 200 formed in the sleeve 196. Once the lens 194 is retained in the sleeve 196, the lens 192 (which is a lens of smaller diameter than the lens 194) abuts against the lens 194, and a C-type retaining ring 202 is used to retain the lens 192 in position against the lens 194. As an alternative construction, the lenses 174, 180, 192, and 194 may be cemented in their respective sleeves. A sleeve 204 fits inside the housing 160, and the rightmost end (as viewed in FIG. 6) of the sleeve 204 abuts against the sleeve 196. The sleeve 204 has an enlarged internal diameter 206 and a reduced internal diameter, which is threaded at 208. The cable 32 is secured in the member 56, as was done in the probe 30 shown in FIG. 5, and the member 56 can similarly be adjusted axially, so as to bring the plane 58 of the ends of the optic fibers 156 into the proper relationship with the optical imaging system just described. A sleeve 210 is used to retain the sleeves 204, 196, and 182 in the position shown in FIG. 6, with the sleeve 182 urging the shoulder 168 on the cap 166 against the shoulder 162 on the housing 160. A fastener 212 is used to lock the sleeve 210 to the housing 160.

The optical imaging system shown in FIG. 6 is essentially a lens system from a standard microscope. The lens 174 has a diameter of 0.236 inch, a front focal length of 1.099 millimeters, and an effective focal length of 7.770 millimeters. The chief advantage of using an imaging system of the type shown in FIG. 6 compared to that shown in FIG. 5 is that the signal strength resulting from the FIG. 6 embodiment is approximately ten times the signal strength of the FIG. 5 embodiment. The single lens optical imaging system shown in FIG. 5 has a greater depth of field because of the smaller numerical aperture and is less likely to produce errors when compared to the FIG. 6 embodiment. The optical imaging system shown in FIG. 5 is obviously cheaper to produce than that shown in FIG. 6.

FIG. 7 shows an enlarged view of one embodiment of the label 26 used in this invention. The paper used in making the label 26 is a standard semigloss white paper which gives good edge definition when printed upon, without having excessive spectral reflectance. The red stripes 214 or bars are shown as black rectangles in FIG. 7, while the green stripes 216 or bars are shown as blank rectangles. The red and stripes 214 and 216, respectively, are printed by conventional printing techniques, a conventional IPI ink P. M. S. Rubine red 03 being used for the red stripes and a conventional Day-Glo Signal Green 077-18 ink being used for the green stripes. The spectrums of the red and green inks are sufficiently spaced so as to minimize the difficulty of separation of the color signals by the filters 72 and 76, best shown in FIG. 3. In the embodiment shown, the label 26 is approximately 1.8 inches long and 0.65 inch wide. As long as the scanning operation is maintained within the width of the label, the scanning may be done at any angle across the length of the label.

FIG. 8 shows the arrangement of the individual optic fibers 156 of the first and second bundles 52 and 54, respectively, as they are arranged at the common plane 58 (FIGS. 5 and 6). Those individual fibers which are part of the first bundle 52 are shown as blank circles, and the 12 fibers of the second bundle 54 are cross-hatched and are arranged in the pattern shown, which pattern is generally star-shaped. This particular pattern was found to provide the best signal while minimizing noise.

The width of the red stripes 214, the green stripes 216 (FIG. 7), and the white stripes therebetween is approximately equal to the overall diameter of the star pattern of the second bundle 54 of optic fibers shown in FIG. 8. Because of aberrations in the optical imaging systems of the probes 30 and 158, there is sufficient scattering of light reflected from the label 26 to the second bundle 54 of optic fibers to produce signals therein.

With reference to FIGS. 9 and 10, there is schematically shown a preferred embodiment of the circuit means previously described with respect to FIG. 2. It is to be understood that the circuit means shown in FIGS. 9 and 10 is constructed of conventional types of logical building blocks, the construction of each of which is well known to those skilled in the art and found in many leading textbooks; for example, as shown in the textbook entitled "Arithmetic Operations in Digital Computers," by R. K. Richards; consequently, a detailed showing thereof is not believed to be necessary for a full understanding and appreciation of the novel aspects of the overall system.

Additionally, in order to further simplify the showing thereof, various input and output terminals are not shown connected. Obviously, all like-labeled terminals and conductors should be connected together in order to obtain a complete schematic showing thereof.

With reference to FIG. 9, the circuit means includes the signal processor network indicated generally by the reference numeral 250, which consists of two linear-type amplifiers 251 and 252, two peak detector and storage units 253 and 254, and two threshold circuits 255 and 256.

In operation, the two outputs from the light-responsive members shown as 74 and 78 in FIG. 2 are respectively fed to the input terminals of the linear amplifiers 252 and 251. The primary function of the peak storage and threshold circuits 253, 254, 255, and 256 is merely to convert the incoming signal from the light-responsive members 74 and 78 to a square wave or digital type of output in a well known manner. Additionally, the peak storage units 253 and 254 provide the means for causing the threshold circuits 255 and 256 to be substantially unresponsive to variations in the signal strength of the output of the amplifiers 251 and 252, again in a well known manner.

It should be realized that, when reflected white light, as from the white stripe that appears between each adjacent colored stripe, is applied over the second bundle 54 of optic fibers to the transducer means 64, a true, or "1," output is produced on both of the conductors 80 and 86, since the white light includes both red and green components. The white stripes are used for clocking purposes to enable the label to be read at almost any speed at which the probe traverses or scans it. The signal level on the conductors 80 and 86 is thus altered from a "true" level to a "false" level on one of the conductors at the time that the probe passes a transition point from the white stripe to a red or green stripe; that is, the signal on the "red" conductor 86 goes "false" when the probe senses a green stripe, and vice versa.

The outputs from the threshold circuits 255 and 256 are then fed into a decoding and clock circuit network, indicated generally as 310, which consists of a two-input logical OR gate 257, a single-shot flip-flop 258, a flip-flop 259 having a clocking input C, and a delay or clocking network which consists of cascade-connected, single-shot flip-flops 260 through 265 having respective outputs A through F, by means of which sequencing or timing pulses are provided, the output marked "C" not being used.

Clocking for the logic circuitry 90 (FIGS. 2, 9, and 10) is based upon the presence of white stripes between the red and green stripes on the label, and the signal transitions that thus appear on the conductors 80 and 86 as the probe traverses the label. Whenever a transition from white to either red or green takes place, the signal on one of the two conductors 92 and 94 (FIG. 9) shifts from a "true" level to a "false" level. Inputs are provided from both of the conductors 92 and 94 to the OR gate 257, with the output of said OR gate being applied as an input to the single-shot flip-flop 258. Thus a change of signal level from "true" to "false" on either conductor 92 or 94 is effective to produce a change in signal level at the output of the OR gate 257, which in turn is effective to trigger the single-shot flip-flop 258 and produce an output signal therefrom. This output signal is applied to the single-shot flip-flop 260 of the chain of flip-flops 260 to 265 inclusive, which produce a plurality of time-displaced clock signals A through F therefrom. These signals are of such duration and time displacement with respect to each other that the chain of signals is completed, prior to the time that the next transition from white to a color takes place by virtue of probe movement.

The reference output "1" and the prime output "0" from the flip-flop 259 are respectively fed as an input to two-input logical AND gates 266 and 267 of the start code recognition circuitry indicated generally as 268. The start code recognition circuitry 268 further includes two binary counters 269 and 270, two four-input logical AND gates 271 and 272, three two-input logical OR gates 273, 274, and 275, and two flip-flops 276 and 277.

The primary function of the start code recognition circuitry 268 is to indicate the particular direction (that is, from left to right or from right to left) in which the label is being scanned. This is accomplished by means of the binary counter 269, which counts the number of green stripes traversed by the probe 30 and hence the number of consecutive binary "1" bits that have occurred. Whenever five consecutive "1" bits are detected by the logical AND gate 271, the flip-flop 276 is set, thereby indicating that all data subsequently being entered is being read in a left-to-right scanning direction from the scanning probe 30. Similarly, the binary counter 270 counts the number of red stripes traversed by the probe and hence the number of consecutive binary "zero." When seven consecutive "zeros" have been detected by the logical AND gate 272, the flip-flop 277 is set, thereby indicating that the label is being traversed by the probe in a reverse direction; that is, from right to left. Additionally, the flip-flops 276 and 277 also indicate that a "start" code has been detected and thereby cause the logical OR gate 274 to allow the signals to operate the remaining portion of the logic by means of a logical AND gate 284 at the time determined by the timing signal applied to its terminal "A." The "shift right," "shift left," and "enable" signals from the start code recognition circuitry 268 are fed to a label storage network indicated generally by 278, which consists of a conventional shift register 279 and five two-input logical AND gates 280 through 284.

The primary function of the label storage network 278 is to store the data in the shift register 279 in such a manner that the final data stored therein is exactly the same, regardless of the particular direction in which the label is traversed by the probe. The length or the total number of storage locations within the shift register 279 is determined by the total amount of data contained on the label and can be made of sufficient length for any application, all in a well known manner.

With reference now to FIG. 10, the output from the label storage network 278 is fed to a timing and control circuit which consists essentially of a modular-5 binary counter 285, a binary counter 286, a character counter 287, nine logical AND gates 288 through 296, two logical OR gates 297 and 298, three inverter-type amplifiers 299 through 301, a flip-flop 302, and a timing network which consists of a series of four cascaded single-shot flip-flops 303 through 306.

As the preferred embodiment of the present invention incorporates a so-called "two-out-of-five" logical code for ten decimal digits to be read from the label, the modular-5 counter 285 is utilized to count the total number of binary "one" and "zero" bits that have been detected, whereas the binary counter 286 counts only the total number of binary "one" data bits that have been detected, and the character counter 287 counts the total number of characters or decimal digits that have occurred, each character corresponding to a binary "one" detected from the output of the modular-5 counter 285 via the logical AND gate 291. The two-out-of-five code uses the positional weights 1, 2, 4, 7, and P, where P is used for a parity check. Whenever a total of five bits have occurred, the output of the binary counter 286 is examined via the logical AND gate 292, the inverter 299, and the logical AND gates 291 and 293 to insure that each decimal digit read from the label consists of two binary "one" bits and three binary "zero" bits. If this situation does not occur, an error output signal is produced by the logical AND gate 293, thereby setting the error flip-flop 302, which, in turn, causes an error signal to appear at the output of the logical OR gate 298.

The "enable" signal produced from the start code recognition element 274 (FIG. 9) starts a timing signal by means of the combination of one-shot flip-flops 303 and 304. The flip-flops 303 and 304 are used to generate a timing pulse which is applied to the AND gate 296 and which is of sufficient time duration to allow the operator to traverse the label with the probe 30. Thus, the timing pulse thereby produced is used to examine the data just read to determine whether or not a complete label has been traversed by the operator. In addition, this timing pulse is also used to generate an error signal via the logical AND gate 295 and the logical OR gate 298 in the event the operator has not traversed the entire label within a predetermined allotted time. Still further, the timing pulse also triggers the one-shot flip-flops 305 and 306, which, in turn, creates a reset pulse which resets all logical counters and flip-flops. This time chosen is of insufficient duration to allow the operator to traverse the same label a second time during a single reading operation.

It will be obvious to anyone skilled in the computer art that the final output produced by the timing and control circuitry (namely, the error output and the data ready signals) may be fed to a suitable processor 40 or other unit for control purposed in any well known manner. Still further, it will be equally obvious that these signals may be fed to separate tone generators and associated speakers to create two different audible tones to indicate a valid reading or an invalid one.

Reference now is made to FIG. 7, which illustrates a typical exemplary showing of a label having a preferred organization of red and green stripes on a white background in accordance with the present invention. In the preferred showing, as viewed from left to right, the label 26 consists of a single red stripe 214 followed by a sequence of five green stripes 216, which collectively constitute the start code. The start code is followed by a succession of ten groups of stripes, with each group consisting of five stripes, with two green stripes and three red stripes making up each group, which collectively represent the value of a particular decimal digit. For example, in the highest order, or tenth, digital position at the left, the numeral "1" is represented by a green stripe followed by three red stripes and ending with a green stripe. In the next lower order digital position, the numeral "2" is represented by a red stripe followed by one green stripe and two red stripes and ending with a green stripe, and so on for the remainder of the 10 digital positions, ending with the first order digital position, in which the numeral "0" is represented by two red stripes followed by two green stripes and ending with a red stripe. The particular start code on the right end of the label, as viewed in FIG. 7, consists of seven red stripes, ending with a green stripe.

If it is assumed now that the operator passes the probe across the label from left to right, as viewed in FIG. 7, the first color encountered is a red stripe 214 corresponding to a binary zero, which is produced by means of the signal-processing portion 250 (FIG. 9) of the logical circuitry and decoded by the flip-flop 259. The first red stripe 214, or first binary "zero" bit, is utilized to reset the binary counter 269 to a count of zero via the logical OR gate 273. As the probe is further moved across the next five consecutive green stripes 216, five consecutive binary "one" bits are produced in the same manner as the first binary "zero" bit was produced, thereby causing the binary counter 269 to reach a count of five. When the binary counter 269 reaches a count of five, the flip-flop 276 is set, thereby indicating that a proper start code has been recognized and that the following detected data should be stored in the shift register 279. The next group of five stripes across which the probe moves, which collectively correspond to the value of the tenth-order decimal digit, is stored in the first-order digital position of the shift register 279. Thereafter, the remaining nine decimal digits are successively read from the label and similarly shifted into the shift register 279 from right to left until the shift register is completely filled with all 10 decimal digits read from the label, with the tenth-order decimal digit stored in the extreme left digital position therein.

After the first decimal digit has been read from the label and stored in the register 279, as indicated by the modular-5 binary counter 285, the logic first checks to insure that a correct code was received, which is indicated by a pickup of two green stripes and three red stripes for each digit position. In other words, for each and every digital position, the particular numerical amount is represented by a corresponding combination of two green stripes and three red stripes. Thereafter, the operation continues until a total of ten legitimate decimal digits have been traversed by the probe, at which time an end-of-label signal is generated by the logical AND gate 294, thereby producing a data-ready signal to the processor 40 via the logical AND gate 296.

If it is assumed now that the operator traverses the label in a right-to-left direction, rather than left to right, as before, the first stripe encountered is a green stripe, which corresponds to a binary "one" but which is produced by the flip-flop 259. This bit is utilized to reset the binary counter 270 to a zero state via the logical OR gate 275. As the probe is next moved across the next seven red stripes, corresponding to seven binary "zero" bits, the binary counter 270 reaches a count of "seven," indicating, via the logical AND gate 272 and the flip-flop 277, that seven consecutive binary zeros have been traversed and that the label is therefore being traversed from the right to the left.

The next five binary bits encountered, corresponding to the decimal value "0," are stored in the shift register 279 in a sequential manner from left to right. Further digits are stored in the shift register in a similar fashion. Thereafter, when the complete ten decimal digits have been detected and stored in the shift register, the first stripe that was encountered in the data field is stored in the extreme right binary position of the shift register, and the last stripe encountered is stored in the extreme left portion of the shift register, thereby illustrating that the number of binary storage positions in the shift register 279 is equal to the total number of red and green stripes representing the ten decimal digits on the label. As the shift register 279 is capable of shifting data in either direction, suitable means are thus provided for making the data stored therein identically independent of the particular direction in which the label is traversed by the operator. Hence, the timing and control portion of the reader operation is exactly the same, regardless of the direction in which the label is being traversed.

It will be obvious to those skilled in the art that the 10-decimal-digit amount thus read from the label and stored in the shift register 279 may thereafter be read out sequentially via the line 307 in a well known manner and thereafter used for further control, indicating, computational, or other purposes.

What we claim is:

1. An apparatus for detecting data from a record member bearing coded data comprising:
   a probe having a reading end adapted to contact the record member and be scribed across the coded data;
   a light source;
   a lens means within said probe and having an optical axis;
   a first bundle of optic fibers having one end of said bundle operatively connected to said light source and the remaining end thereof terminating in said probe;
   transducer means;
   a second bundle of optic fibers having one end operatively connected to said transducer means and the remaining end thereof terminating in said probe;
   said ends of said first and second bundles of optic fibers terminating within said probe being located in a common plane which is perpendicular to said optical axis;
   a coupling member securing the ends of said first and second bundles of optic fibers in said common plane, said coupling member having means cooperating with said probe so as to adjustably position said common plane along said optical axis;
   said lens means being positioned along said optical axis between said common plane and said reading end;
   light from said source passing through said first bundle of fibers, through said lens means and out of said reading end to said record member, and light reflected from said record member passing through said reading end and through said lens means to said second bundle of fibers at said common plane and to said transducer where the light from said record member is converted to electrical signals corresponding to the coded data on the record member as said reading end traverses said record member.

2. The apparatus as claimed in claim 1 in which said lens means includes a single lens and in which the optical fibers of the second bundle are distributed in a star-shaped pattern within the optical fibers of the first bundle.

3. An apparatus for detecting data from a record member bearing coded data comprising:
   a probe having an optical axis and a reading end adapted to contact the record member;
   a light source;
   a first bundle of optic fibers having one end of said bundle operatively connected to said light source and the remaining end thereof terminating in said probe;
   transducer means;
   a second bundle of optic fibers having one end operatively connected to said transducer means and the remaining end thereof terminating in said probe;
   said ends of said first and second bundles of fibers terminating within said probe being located in a common plane which is perpendicular to said axis;
   a coupling member securing the ends of said first and second bundles of optic fibers in said common plane, said coupling member having means cooperating with said probe so as to adjustably position said common plane along the optical axis of said probe;
   a single lens positioned along said optical axis in said probe between said reading end and said common plane;
   light from said source passing through said first bundle of fibers, through said lens and out of said reading end to said record member, and light reflected from said record member passing through said reading end, and through said lens to said second bundle of fibers at said common plane and to said transducer means where the light reflected from said record member is converted into electrical signals corresponding to the coded data on the record member as said probe traverses said record member;
   and information processing means for decoding and checking on the validity of said signals from said transducer means;
   said coded data including a first recognition code at one end and a second recognition code at the opposite end and coded data bits therebetween with a fixed number of data bits of binary ones and zeros representing a character of the data on the record member;
   said information processing means comprising:
   code recognition circuit means;
   logic circuit means;
   shift register means; and
   error checking means;
   said code recognition circuit means being adapted to identify said first and second codes, and to cooperate with said logic circuit means so as to store the data bits in said shift register means in exactly the same relative sequence regardless of the particular direction in which said record member is traversed by said probe; and
   said error checking means to receive the data bits from said shift register means and including binary counter means for counting the binary ones and zeros making up the fixed number of data bits of each character of the data and for producing an error signal when the fixed number of data bits is not present for each character of said coded data.

4. The apparatus as claimed in claim 3 in which said error checking means include means cooperating with said binary counter means to produce an error signal in the event that the sensing of the entire data on the record member is not completed within a given period of time.

UNITED STATES PATENT OFFICE
CERTIFICATE OF CORRECTION

Patent No. 3,584,779  Dated  June 15, 1971

Inventor(s)  Clarence W. Kessler et al.

It is certified that error appears in the above-identified patent and that said Letters Patent are hereby corrected as shown below:

Column 1, line 1, "OPTICAL DATA SENSING SYSTEM" should read -- OPTICAL DATA SENSING SYSTEM WITH PROBE-SCANNER --. Column 2, line 55, "time" should read -- item --. Column 3, line 59, "strips" should read -- stripes --. Column 5, line 12, "090-1-560" should read -- #90-1-560 --; line 14, "OCS 2-61" should read -- #CS 2-61 --; line 17, "06217" should read -- #6217 --; line 26, "090-7" should read -- #90-7 --. Column 7, line 32, "03" should read -- #3 --; line 34, "077-18" should read -- #77-18 --. Column 9, line 8, '"zero"' should read -- "zeros" --. Column 10, line 8, "posed" should read -- poses --.

Signed and sealed this 22nd day of February 1972.

(SEAL)
Attest:

EDWARD M. FLETCHER, JR.  
Attesting Officer

ROBERT GOTTSCHALK  
Commissioner of Patents